(12) United States Patent
Pyo et al.

(10) Patent No.: US 11,487,869 B2
(45) Date of Patent: Nov. 1, 2022

(54) SYSTEMS AND METHODS FOR FUNCTION POINTER PROTECTION BY FUNCTION SYMBOL ENCRYPTION

(71) Applicant: Zeus SW Defender, LLC, Lexington, MA (US)

(72) Inventors: Changwoo Pyo, Seoul (KR); Hyungyu Lee, Yongin (KR); Kyungtae Kim, West Lafayette, IN (US); Gyungho Lee, Norwood, NJ (US)

(73) Assignee: Zeus SW Defender, LLC, Lexington, MA (US)

( * ) Notice: Subject to any disclaimer, the term of this patent is extended or adjusted under 35 U.S.C. 154(b) by 117 days.

(21) Appl. No.: 17/145,790

(22) Filed: Jan. 11, 2021

(65) Prior Publication Data

US 2021/0240819 A1    Aug. 5, 2021

Related U.S. Application Data

(60) Provisional application No. 62/969,209, filed on Feb. 3, 2020.

(51) Int. Cl.
*G06F 21/54* (2013.01)
*G06F 21/60* (2013.01)
*G06F 9/30* (2018.01)

(52) U.S. Cl.
CPC ......... *G06F 21/54* (2013.01); *G06F 9/30007* (2013.01); *G06F 9/30098* (2013.01); *G06F 21/602* (2013.01); *G06F 2221/033* (2013.01)

(58) Field of Classification Search
CPC ........ G06F 21/54; G06F 21/602; G06F 21/52; G06F 9/30007; G06F 9/30098; G06F 2221/033; G06F 8/434
See application file for complete search history.

(56) References Cited

U.S. PATENT DOCUMENTS

| 8,631,248 B2 | 1/2014 | Cowan et al. | |
|---|---|---|---|
| 2008/0162949 A1* | 7/2008 | Sato | G06F 21/14 713/194 |
| 2019/0102567 A1* | 4/2019 | Lemay | G06F 21/44 |

* cited by examiner

*Primary Examiner* — Philip J Chea
*Assistant Examiner* — Sangseok Park
(74) *Attorney, Agent, or Firm* — Daly Crowley Mofford & Durkee, LLP

(57) ABSTRACT

An apparatus, method, and computer program product are provided for encrypting a function symbol with relocation. The apparatus includes a compiler module, a static linker module, and an encryptor module. The compiler module inserts sequences of instructions to decrypt function symbols to be randomized at runtime before indirect function calls. The compiler module inserts an instruction sequence at compile time to encrypt an operand register that receives a local function symbol in position-independent code (PIC), where a call or store instruction uses the register as an operand. The static linker module inserts an encoding section at link time. The encoding section includes two columns representing the sizes of function symbols in bits or bytes and the locations storing the function symbols to be encrypted at runtime. The encryptor module encrypts at runtime the function symbols whose sizes and stored memory locations are identified in the encoding section.

15 Claims, 8 Drawing Sheets

SYSTEMS AND METHODS FOR FUNCTION POINTER PROTECTION BY FUNCTION SYMBOL ENCRYPTION

CROSS-REFERENCE TO RELATED APPLICATIONS

This application claims the benefit of U.S. Provisional Application No. 62/969,209, filed Feb. 3, 2020. The entire content of that application is hereby incorporated herein by reference.

FIELD

The present disclosure generally relates to protection of code pointers, and in particular, the present disclosure relates to systems and methods for function pointer protection by function symbol encryption.

BACKGROUND

There is no way to accurately and efficiently prevent the attacks that intercept control-flow by overwriting function pointer variables in general-purpose programming languages such as C/C++. The existing solutions encrypt function pointer variables whenever some instructions or statements reference the pointer variables. Encryption of function pointer variables could not achieve efficiency as well as correctness because it requires a pointer alias analysis, which does not give an exact solution in general. An existing solution, PointGuard, adopted pointer variable encryption to randomize function pointers. PointGuard encrypts a function pointer variable whenever programs assign a value to the function pointer variable, and it decrypts the function pointer variable when the programs read from the encrypted pointer variable. Unrestricted type casting and pointer arithmetic of C/C++ further aggravate pointer alias problem. Without precise pointer aliasing information, the pointer variable encryption cannot determine whether a pointer or its possible aliases should be encrypted.

SUMMARY OF THE INVENTION

The present invention mainly solves the technical problems existing in the prior art. In response to these problems, the present invention provides methods, apparatuses, and non-transitory computer-readable storage mediums for protecting a function pointer by encrypting one or more function symbols.

An aspect of the present disclosure relates to a method for protecting a function pointer by encrypting one or more function symbols. The method includes a step of inserting a plurality of sequences of a plurality of instructions at compile time for decrypting a plurality of function symbols to be randomized at runtime before a plurality of indirect function calls. Then the method includes a step of inserting an instruction sequence at compile time for encrypting an operand register that receives a local function symbol in position-independent code (PIC), where a call or store instruction uses the register as an operand. Then the method includes a step of inserting an encoding section at link time. In an aspect, the encoding section includes two columns representing the sizes of function symbols in bits or bytes and the locations storing the function symbols to be encrypted at runtime. Then the method includes a step of encrypting at runtime the function symbols whose sizes and stored memory locations are identified in the encoding section.

An aspect of the present disclosure relates to an apparatus for protecting a function pointer by encrypting one or more function symbols. The apparatus includes a memory and a computer processor. The memory stores machine-readable instructions pertaining to the protection of the function pointer. The computer processor is coupled to the memory and operable to execute the machine-readable instructions stored in the memory. The computer processor includes a compiler module, a static linker module, and an encryptor module. The compiler module is configured to insert a plurality of sequences of a plurality of instructions at compile time to decrypt a plurality of function symbols to be randomized at runtime before a plurality of indirect function calls. The compiler module inserts an instruction sequence at compile time to encrypt an operand register that receives a local function symbol in position-independent code (PIC), where a call or store instruction uses the register as an operand. The static linker module is configured to insert an encoding section at link time. The encoding section includes two columns representing the sizes of function symbols in bits or bytes and the locations storing the function symbols to be encrypted at runtime. The encryptor module is configured to encrypt at runtime the function symbols whose sizes and stored memory locations are identified in the encoding section.

An aspect of the present disclosure relates to a non-transitory computer-readable storage medium having instructions encoded thereon that, when executed by a computing device, causes the computing device to perform operations comprising inserting a plurality of sequences of a plurality of instructions at compile time for decrypting a plurality of function symbols to be randomized at runtime before a plurality of indirect function calls. The computer-readable storage medium further comprising inserting an instruction sequence at compile time for encrypting an operand register that receives a local function symbol in position-independent code (PIC), where a call or store instruction uses the register as an operand. The computer-readable storage medium further comprising inserting an encoding section at link time. The encoding section includes two columns representing the sizes of function symbols in bits or bytes and the locations storing the function symbols to be encrypted at runtime. The computer-readable storage medium further comprising encrypting at runtime the function symbols whose sizes and stored memory locations are identified in the encoding section.

Other features of embodiments of the present disclosure will be apparent from accompanying drawings and from the detailed description that follows.

BRIEF DESCRIPTION OF DRAWINGS

This disclosure will be more fully understood from the following detailed description taken in conjunction with the accompanying drawings, in which.

This is done for convenience only as each feature may be combined with any or all of the other features in accordance with the present invention.

DETAILED DESCRIPTION

The present disclosure will now be described more fully with reference to the accompanying drawings, in which embodiments of the present disclosure are shown. However, this disclosure should not be construed as limited to the embodiments set forth herein. Rather, these embodiments are provided so that this disclosure will be thorough and complete, and will fully convey the scope of the present disclosure to those skilled in the art. In the present disclosure, like-numbered components of various embodiments generally have similar features when those components are of a similar nature and/or serve a similar purpose.

The present disclosure is implemented in the context of a system to encrypt a function symbol with relocation. The function symbol is a function's name, called a function designator in the C standard definition. The function designator represents the function address used as control data, which are bound for the program counter. The present system employs encryption to protect function pointer variables. The present system encrypts function symbols rather than function pointer variables. The function symbol encryption does not demand pointer alias analysis, and thus it overcomes intrinsic shortcomings of the pointer variable encryption.

The present disclosure discloses the system and method to encrypt a function symbol with relocation. The proposed system and method instrument programs at compile, link, and the beginning of execution times. Further, the present system and method prevent the attacks that intercept control-flow by overwriting function pointer variables in the general-purpose programming languages such as C/C++ programs.

Figure 1:
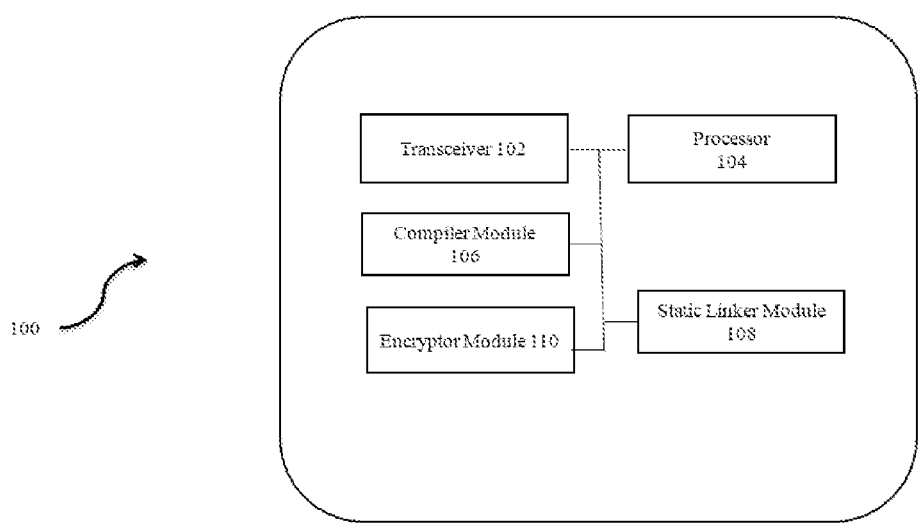
FIG. 1 illustrates an example block diagram of a system to encrypt a function symbol with relocation, according to an example embodiment of the present disclosure.

FIG. 1 illustrates an exemplary block diagram of a system 100 to encrypt a function symbol with relocation, according to an example embodiment of the present disclosure. The system includes a transceiver 102, a processor 104, a compiler module 106, a static linker module 108, and an encryptor module 110. The processor 104 works in coordination with the transceiver 102, the compiler module 106, static linker module 108, and encryptor module 110 for encrypting a function symbol with relocation. Examples of the processor 104 include, but not limited to, an x86-based processor, a Reduced Instruction Set Computing (RISC) processor, an Application-Specific Integrated Circuit (ASIC) processor, a Complex Instruction Set Computing (CISC) processor, and/or other processors.

The transceiver 102 comprises suitable logic, circuitry, interfaces, and/or code that may be configured to receive a request to encrypt function symbols. The transceiver 102 may implement one or more known technologies to support wired or wireless communication with a communication network. In an embodiment, the transceiver 102 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 102 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols, and technologies, such as Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The compiler module 106 is configured to insert a plurality of sequences of instructions to decrypt a plurality of function symbols to be randomized at runtime. According to one embodiment herein, the compiler module 106 inserts sequences of instructions decrypting randomized function symbols before indirect function calls. Since the present system 100 randomizes a function symbol copied to a pointer variable and referenced by indirect calls, there should be a matching sequence of decryption before the corresponding indirect call instruction. For the program depicted in FIG. 2, the compiler module 106 inserts the sequence of decrypting the value fp1 has before the call fp1( ) (approach 2). On the other hand, the compiler module 106 inserts an instruction sequence encrypting a register that receives a local function symbol in position-independent code (PIC) at runtime, where a call or store instruction may use the register as an operand. A function that can be referenced relatively to the program counter does not need relocation, and the current compilers and toolchains do not produce any relocation information for the function. As a result, the static linker and any other module cannot trace the function symbol to be encrypted at runtime, and thus, the encryptor module cannot get any information for encrypting the symbol at runtime. In the present system, the compiler module 106 takes the responsibility of installing an instruction sequence encrypting the function symbol whose location is addressed relative to the program counter.

The static linker module 108 is configured to insert an encoding section, tentatively named "encoding" for convenience, at link time. The encoding section locates the function symbols to be encrypted at runtime. The encoding section includes an offset column and a size column. The offset column represents the runtime memory locations where function symbols to be encrypted are, and the size column represents the symbols' sizes, which are the numbers of address bits, typically either 32 or 64 but possibly other values.

The encryptor module 110 is configured to encrypt at runtime the function symbols whose sizes and stored memory locations are identified in the encoding section. In an embodiment, the function symbols appear in the operand of an indirect function call. The encryptor module 110 is loaded into the executable's process address space to allow the executable itself, runtime system, and dynamic linker or an equivalent module to activate the encryptor module at the beginning of execution. The loader, dynamic linker, or the code sequence of the standard C library leading to the function main takes the responsibility of invoking the encryptor module. The encoding section of the executable binary stores a list of locations where function symbols to be encrypted are.

Figure 2:
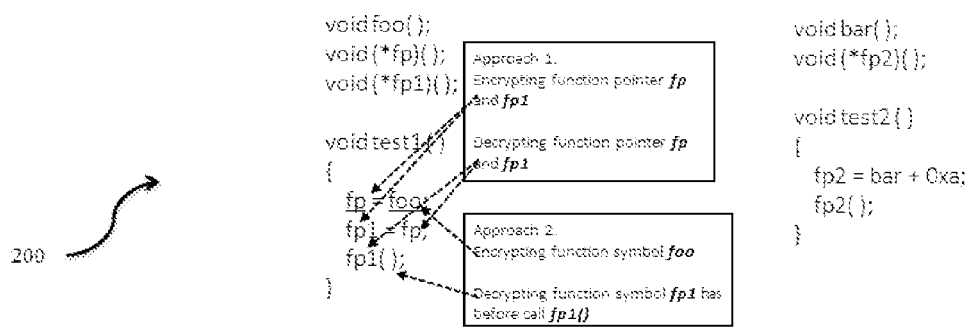
FIG. 2 illustrates a program to encrypt the function symbol, according to an example embodiment of the present disclosure.

FIG. 2 illustrates a program 200 to encrypt the function symbol, according to an example embodiment of the present disclosure. The instrumented programs keep encrypted function symbols and decryption code before indirect calls using function pointers storing the encrypted function symbols. For example, the program depicted in FIG. 2 first encrypts the function symbol foo, and then the encrypted foo is assigned to variable fp. The assignment of fp to fp1 occurs without any crypto work. Before calling function foo by using the function pointer fp1, a decryption instruction sequence inserted during compilation restores the address of function foo.

According to one embodiment herein, the function symbol encryption occurs at the earliest moment of program execution. This delay of encryption until execution eliminates the risk of exposing the encryption key. Note that the static linker may activate the encryptor module after building the encoding section. Then encryption keys remain fixed throughout the lifetime of the executable binary. As a consequence, adversaries can get the key by looking into the binary, or they can try indefinitely to expose the key in a brute-force manner. According to one embodiment herein, the present method sets up the keys at runtime and encrypts at the beginning of execution. Note that the program loader or dynamic linker can take the role of the encryptor module. Nevertheless, employing the separate encryptor module is more appropriate than entrusting encryption to the loader or dynamic linker regarding transparency and compatibility. With the separate encryption module, application programmers do not need to know its existence, and it does not require kernel modification as well.

Compared to the encryption of function pointer variables, the function symbol encryption eliminates the points-to analysis. Also, the function symbol encryption reduces the number of necessary encryptions and decryptions. Suppose that function test1 in FIG. 2 repeats ten times. The function symbol encryption, approach 1, necessitates eleven crypto operations (one encryption and ten decryptions), whereas the pointer variable encryption, approach 2, requires forty operations (twenty encryptions and twenty decryptions).

However, this advantage should pay the price for sacrificing compatibility with some non-standard C programs. The call using the variable fp2 in FIG. 2 would cause a crash when the function symbol bar is encrypted. However, the code is an unusual and bad practice that casts the type of a function pointer to the integer type, performs an arithmetic operation on the pointer, and executes a call instruction after casting back to the function pointer type. The C standard specifies that such code has undefined behavior. The present system and method check programs to warn address arithmetic, and also require programmers to manually insert encryption and decryption code for typecasting and pointer arithmetic. In the program depicted in FIG. 2, the assignment to the pointer variable fp2 can avoid the compatibility problem by modifying the statement to fp2=e(d(bar)+0×a) where e( ) and d( ) represent encryption and decryption functions respectively. Function symbol encryption had no problem in building the standard C libraries.

Figure 3:
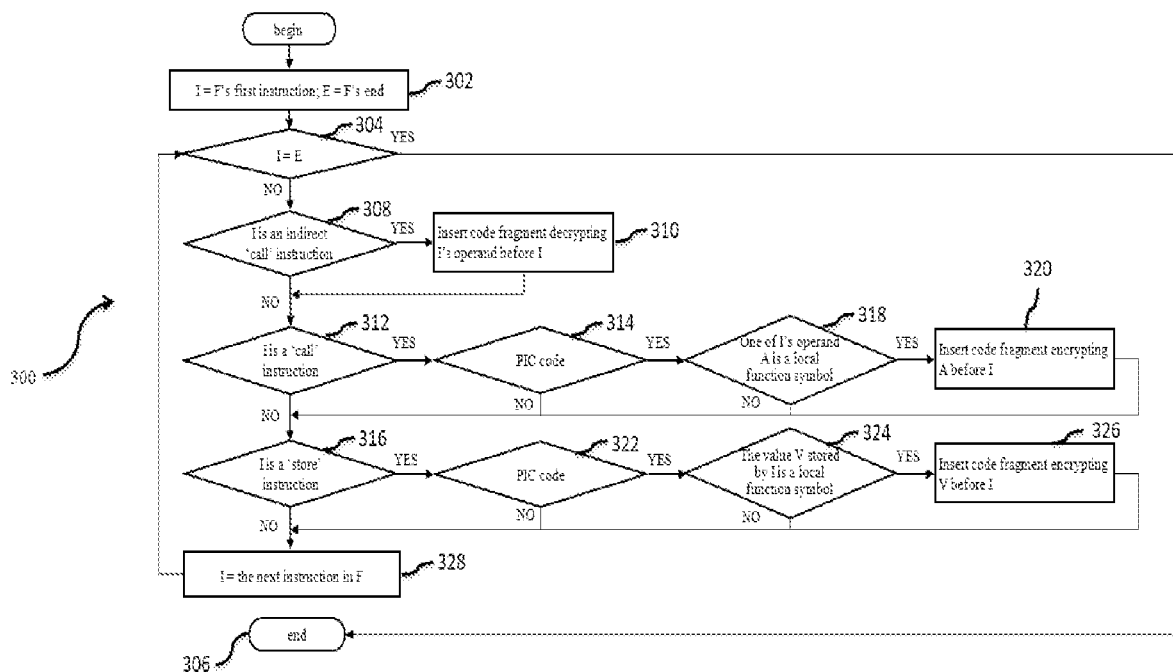
FIG. 3 illustrates an operational flowchart of a compiler module, according to some embodiments of the present disclosure.

FIG. 3 illustrates an operational flowchart 300 of a compiler module, according to some embodiments of the present disclosure. FIG. 3 is explained in conjunction with FIG. 1. At step 302, the first instruction of a function F as the current instruction I and the end E of the function F are obtained. At step 304, the compiler module determines whether I is equal to E. If I is equal to E, at step 306, the control loop for inserting instructions terminates. At step 308, the compile module determines whether I is an indirect 'call' instruction. If I is an indirect 'call' instruction, it inserts code fragment decrypting I's operand before I at step 310. At step 312, the compiler module determines whether I is a 'call' instruction. If I is a 'call' instruction, then the compiler module determines whether the function F is PIC code at step 314. If the function F is PIC code, the compiler module determines whether one of I's operand A is a local function symbol at step 318. If one of I's operand A is a local function symbol, the compiler module inserts code fragment encrypting A before I at step 320. At step 316, the compiler module determines I is a 'store' instruction. If I is a 'store' instruction, the compiler module again determines the function F is PIC code at step 322. If the function F is PIC code, the compiler module determines the value V stored by I is a local function symbol at step 324. If the value V stored by I is a local function symbol, the compiler module inserts a code fragment encrypting V before I at step 326. At step 328, the compiler module takes the next instruction in F as the new current instruction I and repeats from step 304.

Figure 4:
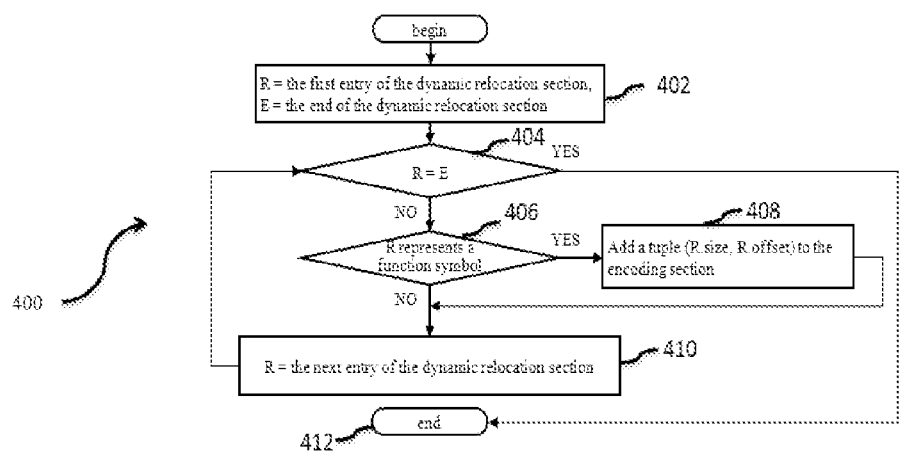
FIG. 4 illustrates a first method flowchart for building the encoding section by the static linker module for position-independent code (PIC), according to some embodiments of the present disclosure.

FIG. 4 illustrates a first method flowchart 400 for building the encoding section by the static linker module for PIC, according to some embodiments of the present disclosure. FIG. 4 is explained in conjunction with FIG. 3. At step 402, the static linker gets the first entry of the dynamic relocation section as the current entry R to be processed and the end E of the dynamic relocation section, wherein the entry R includes the size of address bits (R.size), the location to be relocated (R.offset), and other information pertaining to relocation. At step 404, the static linker module determines whether the current entry R of the dynamic relocation section is equal to the end E of the dynamic relocation section. If R is equal to E, the static linker terminates the insertion of entries into the encoding section at step 412. At step 406, the static linker module determines whether the current entry R represents a function symbol. If R represents a function symbol, the static linker module adds a tuple of the size of address bits (R.size) and the location to be relocated (R.offset) taken from the current entry R to the encoding section at step 408. At step 410, static linker takes the next entry in the dynamic relocation section as the new current entry R and repeat from step 404.

Figure 5:
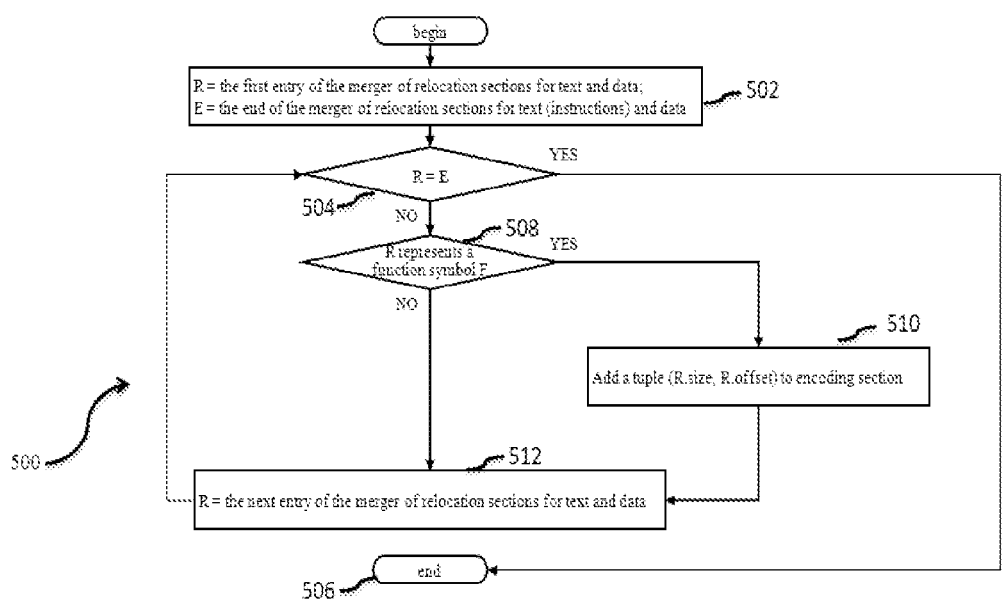
FIG. 5 illustrates a second method flowchart for building the encoding section by the static linker module for non-PIC, according to some embodiments of the present disclosure.

FIG. 5 illustrates a second method flowchart 500 for building the encoding section by the static linker module for non-PIC, according to some embodiments of the present disclosure. FIG. 5 is explained in conjunction with FIG. 4. At step 502, the static linker gets the first entry of the merger of relocation sections for text (instructions) and data sections as the current relocation entry R and the end E of the merger, wherein the entry R includes the size of address bits R.size, the location to be relocated R.offset, and other information pertaining to relocation. At step 504, the static linker module determines whether the current entry R of the merger is equal to the end E of the merger. If R is equal to E, the static linker terminates the insertion of entries into the encoding section at step 506. At step 508, the static linker module determines whether the current relocation entry R represents a function symbol F, and if so, it adds the size of address bits (R.size) and location to be relocated (R.offset) to the encoding section at step 510. At step 512, the static linker module takes the next entry of the merger as the new current entry R and repeats from step 504

Figure 6:
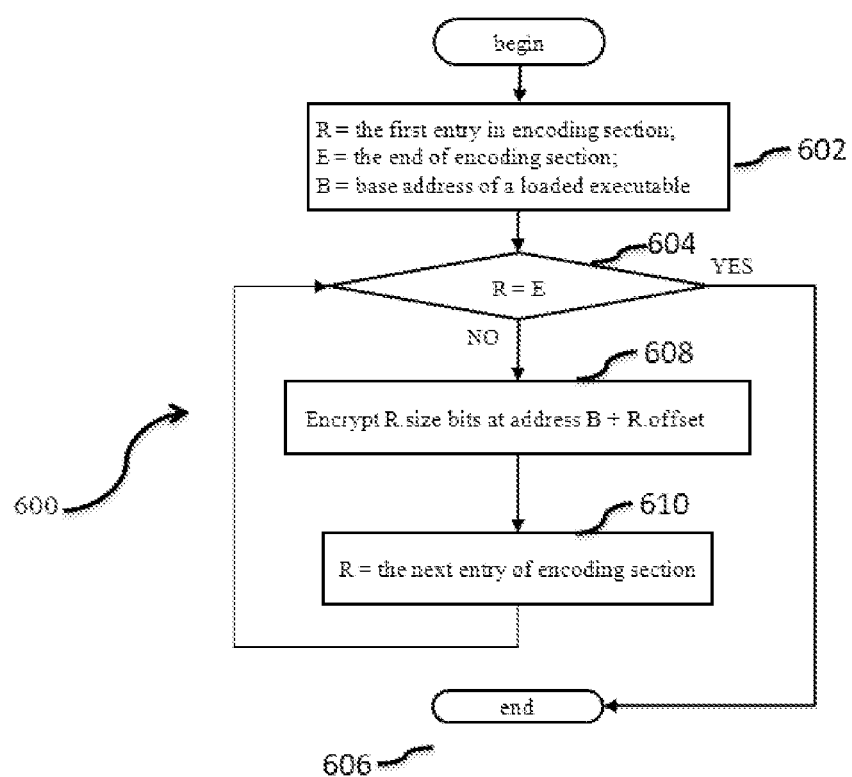
FIG. 6 illustrates an operational flowchart of an encryptor module, according to some embodiments of the present disclosure.

FIG. 6 illustrates an operational flowchart 600 of an encryptor module, according to some embodiments of the present disclosure. FIG. 6 is explained in conjunction with FIG. 1. At step 602, the encryptor gets the first encryption entry R of the encoding section as the current encryption entry and the end E of the encoding section. It also gets the base address B of the loaded executable module. At step 604, the encryptor module determines whether R is equal to E. If R is equal to E, the encryptor module terminates encryption of function symbols at step 606 and the program resumes execution. At step 608, it encrypts the function symbol whose size (R.size) the current entry R delivers and whose address is obtained from the base address B and the location (R.offset) that the current encryption entry R delivers. At step 610, the encryptor gets the next entry of encoding section as the new current encryption entry R and repeats from step 604.

Figure 7:
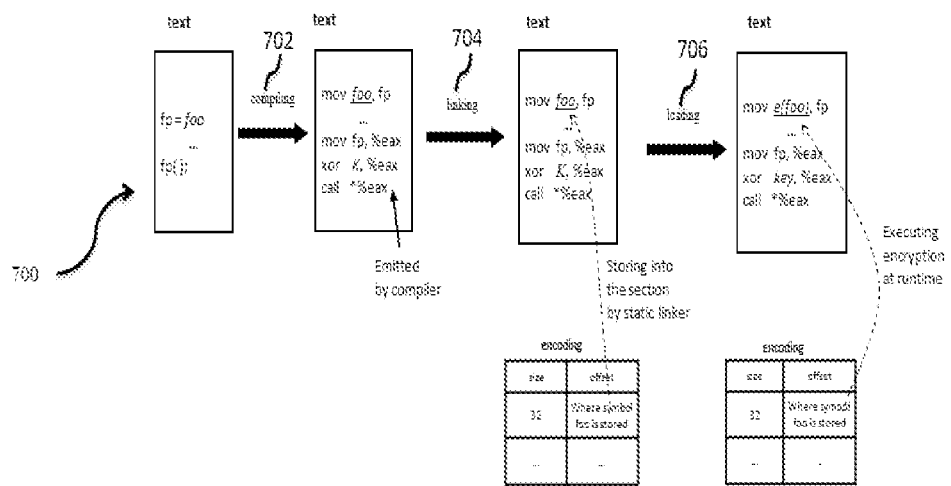
FIG. 7 illustrates a block diagram of a part of a non-PIC program compiled with the present compiler and toolchains at each translation phase, compiling, linking, and loading, according to an example embodiment of the present disclosure.

FIG. 7 illustrates a block diagram 700 of a part of a non-PIC program for x86 processors compiled with the present compiler and toolchains at each translation phase, compiling, linking, and loading, according to an example embodiment of the present disclosure. In the figure, fp is a function pointer variable, and foo is a function symbol. The call through pointer fp implicitly calls function foo. At stage 702, while compiling the source code, the compiler injects the decryption sequence. In the following stage 704, the static linker can find the absolute address where the symbol foo is stored at linking and put this information into the encoding section. The linker completes this task by confirming the foo's symbol type (FUNC) and the corresponding relocation type, for example, relocation for a 32 bits virtual address or a 32 bits sign-extended virtual address. It shows that foo is a function symbol and that the corresponding relocation is relevant to foo's absolute address. Finally, at stage 706, using the encoding section entry, the encryptor module randomizes the symbol foo, giving e(foo), at the beginning of execution. For a PIC program, the compiler module generates the memory access code for a symbol in a way different from non-PIC. The reason is that the compiler module cannot determine the runtime address of the symbol due to position-independent nature.

Figure 8:
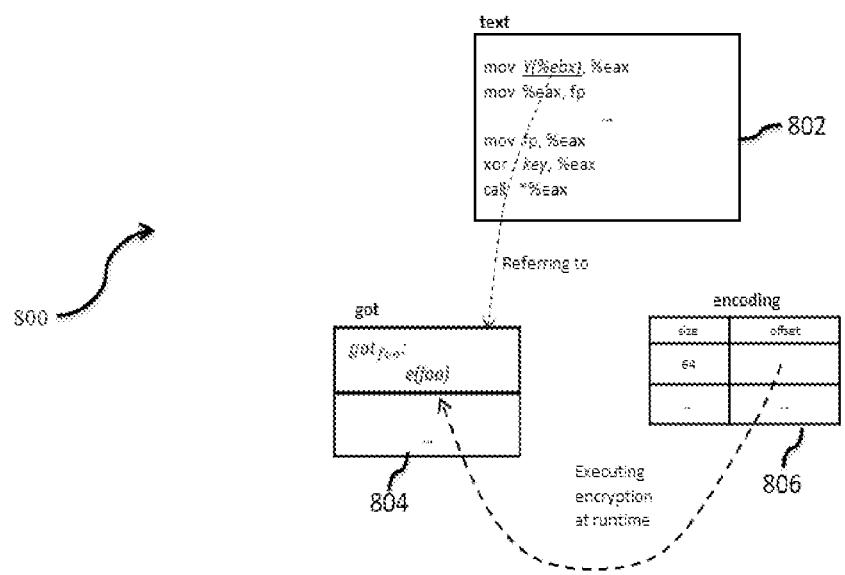
FIG. 8 illustrates a block diagram to indicate the corresponding sections of an executable program when compiled with PIC option, according to an example embodiment of the present disclosure.

FIG. 8 illustrates a block diagram 800 to indicate the corresponding sections of an executable program for x86 processors when compiled with the PIC option, according to an example embodiment of the present disclosure. At stage 802, the compiler module generates the expression Y (% ebx) to denote the function foo. At stage 804, the actual address of the symbol foo is held in the entry $got_{foo}$ of the GOT after the dynamic linker loads the program. This entry is the location to which the expression Y (% ebx) points. At program loading, the dynamic linker would set the $got_{foo}$ entry to foo's actual address using the relevant relocation entry for global data. Encryptor accesses the $got_{foo}$ entry in the encryption phase. The static linker checks whether the relocation entry is for global data and the relevant symbol table entry represents a function to decide if it is necessary to encrypt the symbol. At stage 806, if it is, the static linker puts the $got_{foo}$ entry's location into the encoding section. With the program execution starts, the encryptor module relocates and encrypts the $got_{foo}$ entry using the information in the relocation and encoding sections.

Unlike encryption, decryption is solely dealt with the compiler, regardless of position independence. The compiler's code generator checks every indirect call pattern and emits a newly generated decrypting sequence before every indirect call instruction (shown in FIG. 7 and FIG. 8). Note that an indirect call instruction may take a memory location as its operand, e.g., call *0x8(% eax). Given the location of the decryption code right before the indirect call instruction, there is a potential risk of leaving plain function address in the memory. As mitigation of this vulnerability, the present method enforces all indirect call instructions to employ registers as their operands for target addresses. The memory never stores function addresses in plaintext while the process is active.

Accordingly, one advantage of the present invention is that it does not require pointer alias analysis for protecting function pointer variables by encryption. Compared with the encryption of function pointer variables, function symbol encryption reduces the amount of cryptographic work, and thus the performance overhead.

Accordingly, one advantage of the present invention is that it takes the most secure and efficient timing of the encryption of function addresses, which is execution time by which the locations of functions should be finalized.

Accordingly, one advantage of the present invention is that it distributes the task of function symbol encryption among a compiler, linker, loader, or dynamic linker as a part of function symbol relocation, and the invention makes it easy to understand and realize.

Accordingly, one advantage of the present invention is that it generates new encryption keys whenever a program starts execution.

The method flowcharts or processes described above, and steps thereof, may be realized/executed in hardware, software, or any combination of these suitable for a particular application. The hardware may include a general-purpose computer and/or dedicated computing device. The processes may be realized in one or more microprocessors, microcontrollers, embedded microcontrollers, state machines, programmable digital signal processors or other programmable device, along with internal and/or external memory. The processes may also, or instead, be embodied in a general-purpose processor, a digital signal processor (DSP), an application-specific integrated circuit, a programmable gate array, programmable array logic, or any other device or combination of devices that may be configured to process electronic signals.

It will further be appreciated that one or more of the processes may be realized as computer-executable code created using a structured programming language such as C, an object-oriented programming languages such as C++ and Java, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Computer storage media includes volatile and non-volatile, removable and non-removable media implemented in any method or technology for storage of information such as computer-readable instructions, data structures, program modules, or other data. Computer storage media can include memory devices (e.g., random access memory (RAM), read-only memory (ROM), electrically erasable programmable read-only memory (EEPROM)), magnetic storage devices (e.g., hard disk, floppy disk, cassettes, tape), optical disks (e.g., compact disk (CD), digital versatile disk (DVD)), and solid-state devices (e.g., solid-state drive (SSD), flash memory drive (e.g., card, stick, key drive)), or any other like medium which can be used to store the desired information and which can be accessed by the computer.

The set of instructions may include one or more commands that instruct the processing machine to perform specific tasks that constitute the method of the present disclosure. The set of instructions may be in the form of a software program. Further, the software may be in the form of a collection of separate programs, a program module with a larger program, or a portion of a program module, as in the present disclosure. The software may also include modular programming in the form of object-oriented programming. The processing of input data by the processing machine may be in response to user commands, results of previous processing or a request made by another processing machine.

For a person skilled in the art, it is understood that these are exemplary case scenarios and exemplary snapshots discussed for understanding purposes. However, many variations to these can be implemented to encrypt function symbols in C and C++ programs.

In the drawings and specification, there have been disclosed exemplary embodiments of the present disclosure. Although specific terms are employed, they are used in a generic and descriptive sense only and not for purposes of limitation, the scope of the present disclosure being defined by the following claims. Those skilled in the art will recognize that the present disclosure admits of a number of modifications, within the spirit and scope of the inventive concepts, and that it may be applied in numerous applications, only some of which have been described herein. It is intended by the following claims to claim all such modifications and variations which fall within the true scope of the present disclosure.

What is claimed is:

1. A method for protecting a function pointer by encrypting one or more function symbols, comprising steps of:
    inserting a plurality of sequences of a plurality of instructions at compile time for decrypting the function symbols to be randomized at runtime before a plurality of indirect function calls;
    inserting an instruction sequence at compile time for encrypting an operand register that receives a local function symbol in a position-independent code (PIC), where a call or store instruction uses the register as an operand;
    inserting an encoding section at link time, wherein the encoding section comprises two columns representing sizes of the function symbols in bits or bytes and locations storing the function symbols to be encrypted at runtime; and
    encrypting at runtime the function symbols whose sizes and locations are identified in the encoding section.

2. The method as claimed in claim 1, wherein the step of inserting the plurality of sequences of the plurality of instructions for decrypting the function symbols before the plurality of indirect function calls and the step of inserting the instruction sequence for encrypting the operand register that receives the local function symbol in the position-independent code (PIC) comprising steps of:

(a) obtaining a first instruction of a function (F) as a current instruction (I) and an end (E) of the function (F);
    (b) determining whether the current instruction (I) is equal to the end (E);
    (c) determining whether the current instruction (I) is an indirect call instruction, and if so, inserting a code fragment decrypting the current instruction (I)'s operand representing the function symbols before the current instruction (I);
    (d) determining whether the current instruction (I) is a call instruction, and if so, determining whether the function (F) is the PIC code, and if the function (F) is the PIC code, then determining whether at least one operand (A) of the current instruction (I) the local function symbol, and if so, inserting a code fragment encrypting the operand (A) before the current instruction (I);
    (e) determining whether the current instruction (I) is a store instruction, and if so, determining whether the function (F) is the PIC code, and if the function (F) is the PIC code, then determining whether a stored value (V) by the current instruction (I) represents the local function symbol, and if so, inserting the code fragment encrypting the value (V) before the current instruction (I);
    (f) getting a next instruction of the function (F) as a new current instruction (I); and
    (g) repeating the operations of steps (b)-(f).

3. The method as claimed in claim 1, wherein the step of inserting the encoding section for position-independent code (PIC) at link time comprising steps of:
    (a) getting a first entry of a dynamic relocation section as a current entry (R) and an end (E) of the dynamic relocation section, wherein the current entry (R) includes a size of address bits (R.size), a location to be relocated (R.offset), and other information pertaining to relocation;
    (b) determining whether the current entry (R) of the dynamic relocation section is equal to the end (E) of the dynamic relocation section; and if so, terminating insertion of entries into the encoding section;
    (c) determining whether the current entry (R) represents a function symbol, and if so, adding a tuple of the size of address bits (R.size) and the location to be relocated (R.offset) to the encoding section; and
    (d) getting a next entry of the dynamic relocation section as a new current entry (R); and
    (e) repeating the operations of the steps (b)-(d).

4. The method as claimed in claim 1, wherein the step of inserting the encoding section for non-position-independent code (PIC) at link time further comprising steps of:
    (a) getting a first entry of a merger of a dynamic relocation section for text (instructions) and a data section as a current entry (R) and an end (E) of the merger, wherein the current entry (R) includes a size of address bits (R.size), a location to be relocated (R.offset), and other information pertaining to relocation;
    (b) determining whether the current entry (R) of the merger is equal to the end (E) of the merger; and if so, terminating insertion of entries into the encoding section;
    (c) determining whether the current entry (R) represents a function symbol (F), and if so, adding the size of address bits (R.size) and the location to be relocated (R.offset) to the encoding section;

(d) getting a next entry of the merger as the new current entry (R); and (e) repeating the operations of steps (b)-(d).

5. The method as claimed in claim 1, wherein the step of encrypting the function symbols at runtime comprising steps of:

(a) getting a first encryption entry of the encoding section as a current encryption entry (R) and an end (E) of the encoding section;

(b) getting a base address (B) of the loaded executable module;

(c) determining whether the current encryption entry (R) of the encoding section is equal to the end (E) of the encoding section; and if so, terminating encryption of the function symbols and starting program execution;

(d) encrypting address bits whose size (R.size) the current entry (R) delivers and whose address is obtained from the base address (B) and a location (R.offset) that the current encryption entry (R) delivers;

(e) getting a next entry of the encoding section as the new current encryption entry (R); and (f) repeating the operations of the steps (c)-(e).

6. An apparatus for protecting a function pointer by encrypting one or more function symbols, the apparatus comprising:

a memory to store machine-readable instructions pertaining to the protection of the function pointer; and a computer processor coupled to the memory and operable to execute the machine-readable instructions stored in the memory, wherein the computer processor comprises:

a compiler module to insert a plurality of sequences of a plurality of instructions at compile time for decrypting the function symbols to be randomized at runtime before a plurality of indirect function calls, wherein the compiler module inserts an instruction sequence at compile time for encrypting an operand register that receives a local function symbol in a position-independent code (PIC), where a call or store instruction uses the register as an operand;

a static linker module to insert an encoding section at link time, wherein the encoding section comprises two columns representing sizes of the function symbols in bits or bytes and locations storing the function symbols to be encrypted at runtime; and an encryptor module to encrypt at runtime the function symbols whose sizes and stored locations are identified in the encoding section.

7. The apparatus as claimed in claim 6, wherein the compiler module is further configured to:

(a) obtain a first instruction of a function (F) as a current instruction (I) and an end (E) of the function (F);

(b) determine whether the current instruction (I) is equal to the end (E);

(c) determine whether the current instruction (I) is an indirect call instruction, and if so, insert a code fragment decrypting the current instruction (I)'s operand representing the function symbols before the current instruction (I);

(d) determine whether the current instruction (I) is a call instruction, and if so, determining whether the function (F) is the PIC code, and if the function (F) is the PIC code, then determine whether at least one operand (A) of the current instruction (I) is the local function symbol, and if so, inserting a code fragment encrypting the operand (A) before the current instruction (I);

(e) determine whether the current instruction (I) is a store instruction, and if so, determine whether the function (F) is the PIC code, and if the function (F) is the PIC code, then determine whether a stored value (V) by the current instruction (I) represents the local function symbol, and if so, insert the code fragment encrypting the value (V) before the current instruction (I);

(f) get a next instruction of the function (F) as a new current instruction (I); and (g) repeat the operations of steps (b)-(f).

8. The apparatus as claimed in claim 6, wherein the static linker module is further configured to:

(a) get a first entry of a dynamic relocation section as a current entry (R) and an end (E) of the dynamic relocation section, wherein the current entry (R) includes a size of address bits (R.size), a location to be relocated (R.offset), and other information pertaining to relocation;

(b) determine whether the current entry (R) of the dynamic relocation section is equal to the end (E) of the dynamic relocation section; and if so, terminate insertion of entries into the encoding section;

(c) determine whether the current entry (R) represents a function symbol, and if so, add a tuple of the size of address bits (R.size) and the location to be relocated (R.offset) to the encoding section; and (d) get a next entry of the dynamic relocation section as a new current entry (R); and (e) repeat the operations of the steps (b)-(d).

9. The apparatus as claimed in claim 6, wherein the static linker module is further configured to:

(a) get a first entry of a merger of a dynamic relocation section for text (instructions) and a data section as a current entry (R) and an end (E) of the merger, wherein the current entry (R) includes a size of address bits (R.size), a location to be relocated (R.offset), and other information pertaining to relocation;

(b) determine whether the current entry (R) of the merger is equal to the end (E) of the merger; and if so, terminate insertion of entries into the encoding section;

(c) determine whether the current entry (R) represents a function symbol (F), and if so, add the size of address bits (R.size) and the location to be encrypted (R.offset) to the encoding section;

(d) get a next entry of the merger as the new current entry (R); and (e) repeating the operations of steps (b)-(d).

10. The apparatus as claimed in claim 6, wherein the encryptor module is further configured to:

(a) get a first encryption entry of the encoding section as a current encryption entry (R) and an end (E) of the encoding section;

(b) get a base address (B) of the loaded executable module;

(c) determine whether the current encryption entry (R) of the encoding section is equal to the end (E) of the encoding section; and if so, terminate encryption of the function symbols and starting program execution;

(d) encrypt address bits whose size (R.size) the current entry (R) delivers and whose address is obtained from the base address (B) and a location (R.offset) that the current encryption entry delivers;

(e) get a next entry of the encoding section as the new current encryption entry (R); and (f) repeat the operations of the steps (c)-(e).

11. A non-transitory computer-readable storage medium having instructions encoded thereon that, when executed by a computing device, causes the computing device to perform operations comprising steps of:
- inserting a plurality of sequences of a plurality of instructions at compile time for decrypting the function symbols to be randomized at runtime before a plurality of indirect function calls;
- inserting an instruction sequence at compile time for encrypting an operand register that receives a local function symbol in a position-independent code (PIC), where a call or store instruction uses the register as an operand;
- inserting an encoding section at link time, wherein the encoding section comprises two columns representing sizes of the function symbols in bits or bytes and locations storing the function symbols to be encrypted at runtime; and
- encrypting at runtime the function symbols whose sizes and stored locations are identified in the encoding section.

12. The non-transitory computer-readable storage medium according to claim 11, wherein the step of inserting the plurality of sequences of the plurality of instructions for decrypting the plurality of function symbols before the plurality of indirect function calls and the step of inserting the instruction sequence for encrypting the operand register that receives a local function symbol in position-independent code (PIC) comprising steps of:
  (a) obtaining a first instruction of a function (F) as a current instruction (I) and an end (E) of the function (F);
  (b) determining whether the current instruction (I) is equal to the end (E);
  (c) determining whether the current instruction (I) is an indirect call instruction, and if so, inserting a code fragment decrypting the current instruction (I)'s operand representing the function symbols before the current instruction (I);
  (d) determining whether the current instruction (I) is a call instruction, and if so, determining whether the function (F) is the PIC code, and if the function (F) is the PIC code, then determining whether at least one operand (A) of the current instruction (I) is the local function symbol, and if so, inserting a code fragment encrypting the operand (A) before the current instruction (I);
  (e) determining whether the current instruction (I) is a store instruction, and if so, determining whether the function (F) is the PIC code, and if the function (F) is the PIC code, then determining whether a stored value (V) by the current instruction (I) represents the local function symbol, and if so, inserting the code fragment encrypting the value (V) before the current instruction (I);
  (f) getting a next instruction of the function (F) as a new current instruction (I); and
  (g) repeating the operations of steps (b)-(f).

13. The non-transitory computer-readable storage medium according to claim 11, wherein the step of inserting the encoding section for position-independent code (PIC) at link time comprising steps of:
  (a) getting a first entry of a dynamic relocation section as a current entry (R) and an end (E) of the dynamic relocation section, wherein the current entry (R) includes a size of address bits (R.size), a location to be relocated (R.offset), and other information pertaining to relocation;
  (b) determining whether the current entry (R) of the dynamic relocation section is equal to the end (E) of the dynamic relocation section; and if so, terminating insertion of entries into the encoding section;
  (c) determining whether the current entry (R) represents a function symbol, and if so, adding a tuple of the size of address bits (R.size) and the location to be relocated (R.offset) to the encoding section; and
  (d) getting a next entry of the dynamic relocation section as a new current entry (R); and
  (e) repeating the operations of the steps (b)-(d).

14. The non-transitory computer-readable storage medium according to claim 11, wherein the step of inserting the encoding section for non-position-independent code (PIC) at link time further comprising steps of:
  (a) getting a first entry of a merger of a dynamic relocation section for text (instructions) and a data section as a current entry (R) and an end (E) of the merger, wherein the current entry (R) includes a size of address bits (R.size), a location to be relocated (R.offset), and other information pertaining to relocation;
  (b) determining whether the current entry (R) of the merger is equal to the end (E) of the merger; and if so, terminating insertion of entries into the encoding section;
  (c) determining whether the current entry (R) represents a function symbol (F), and if so, adding the size of address bits (R.size) and location to be relocated (R.offset) to the encoding section;
  (d) getting a next entry of the merger as the new current entry (R); and
  (e) repeating the operations of steps (b)-(d).

15. The non-transitory computer-readable storage medium according to claim 11, wherein the step of encrypting the function symbols at runtime comprising steps of:
  (a) getting a first encryption entry of the encoding section as a current encryption entry (R) and an end (E) of the encoding section;
  (b) getting a base address (B) of the loaded executable module;
  (c) determining whether the current encryption entry (R) of the encoding section is equal to the end (E) of the encoding section; and if so, terminating encryption of the function symbols and starting program execution;
  (d) encrypting address bits whose size (R.size) the current entry (R) delivers and whose address is obtained from the base address (B) and a location (R.offset) that the current encryption entry delivers;
  (e) getting a next entry of the encoding section as the new current encryption entry (R); and
  (f) repeating the operations of the steps (c)-(e).

* * * * *